(12) United States Patent
Wu et al.

(10) Patent No.: US 12,225,148 B2
(45) Date of Patent: Feb. 11, 2025

(54) COMMUNICATION DEVICE AND FIXING ELEMENT THEREOF

(71) Applicant: Wistron Corporation, New Taipei (TW)

(72) Inventors: Cheng-Hao Wu, New Taipei (TW); Wei-Hsiang Huang, New Taipei (TW); Pin-Shiuan Wang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 348 days.

(21) Appl. No.: 17/750,453

(22) Filed: May 23, 2022

(65) Prior Publication Data
US 2023/0216176 A1 Jul. 6, 2023

(30) Foreign Application Priority Data
Jan. 6, 2022 (TW) .................................. 111100634

(51) Int. Cl.
*H04M 1/02* (2006.01)
*H01Q 1/20* (2006.01)
*H04B 1/03* (2006.01)
*H04B 1/08* (2006.01)

(52) U.S. Cl.
CPC .............. *H04M 1/026* (2013.01); *H01Q 1/20* (2013.01)

(58) Field of Classification Search
CPC .......... H04M 1/026; H04M 1/02; H04M 1/03; H04B 1/03; H04B 1/08; H01Q 1/20; H05K 5/0217; H05K 5/03; G09F 9/00
See application file for complete search history.

(56) References Cited

U.S. PATENT DOCUMENTS

| | | | | |
|---|---|---|---|---|
| 8,149,590 B2* | 4/2012 | Cho | ....................... | H05K 7/142 |
| | | | | 361/742 |
| 10,149,029 B2* | 12/2018 | Jia | .......................... | H04M 1/035 |
| 2012/0075824 A1* | 3/2012 | Yu | ............................ | G06F 1/181 |
| | | | | 361/809 |

(Continued)

FOREIGN PATENT DOCUMENTS

| CN | 212276347 U | 1/2021 |
|---|---|---|
| TW | M556355 U | 3/2018 |
| TW | 202042445 A | 11/2020 |

OTHER PUBLICATIONS

Examination report dated Nov. 10, 2022, listed in related Taiwan patent application No. 111100634.

*Primary Examiner* — Andrew Wendell
(74) *Attorney, Agent, or Firm* — McClure, Qualey & Rodack, LLP

(57) ABSTRACT

A communication device includes a wireless communication module, a frame element, and a fixing assembly. The frame element includes a bottom plate and a side plate connected to the bottom plate, and the side plate includes a fixing hole. The fixing assembly includes a first fixing element. The first fixing element includes a first connection portion and a first fixing portion. The first connection portion is adapted to be fixed to the wireless communication module, and the first fixing portion includes a first neck portion and a first protruding portion. The first neck portion is adapted to be in the fixing hole, and the first neck portion is connected between the first connection portion and the first protruding portion. Hence, the fixing component fixes the wireless communication module with the frame element.

17 Claims, 9 Drawing Sheets

(56) References Cited

U.S. PATENT DOCUMENTS

| | | | |
|---|---|---|---|
| 2013/0322048 A1* | 12/2013 | Wan | H05K 7/14 |
| | | | 361/818 |
| 2017/0214122 A1* | 7/2017 | Chiang | H01Q 5/371 |
| 2020/0163204 A1* | 5/2020 | Kim | H05K 5/0217 |
| 2021/0242573 A1* | 8/2021 | Hsieh | H01Q 19/15 |
| 2022/0216595 A1* | 7/2022 | Seo | H01Q 1/243 |

* cited by examiner

COMMUNICATION DEVICE AND FIXING ELEMENT THEREOF

CROSS-REFERENCE TO RELATED APPLICATION

This non-provisional application claims priority under 35 U.S.C. § 119(a) to Patent Application No. 111100634 filed in Taiwan, R.O.C. on Jan. 6, 2022, and the entire contents of which are hereby incorporated by reference.

BACKGROUND

Technical Field

The instant disclosure relates to a communication device and a fixing element thereof, particularly a communication device having a wireless communication module that is fixed to a certain position of the communication device by a fixing element.

Related Art

In the design of stacking and/or arrangement for fixing multiple components, with the illustration of the Cartesian coordinate system (X-Y-Z axis), displacements of the components in the X direction and the Y direction are usually fixed or limited by a fixing assembly, so that these components are fixed on the X-Y plane. Displacement of the components in the Z direction are then fixed or limited by another fixing assembly. Therefore, these components are fixed within a limited range of the X direction, the Y direction, and the Z direction. As a result, at least two fixing assemblies (including a fixing assembly for limiting the displacements in the X direction and the Y direction and another fixing assembly for limiting the displacement in the Z direction) are needed to be applied to these components so as to fix or limit these components with acceptable displacements in the X direction, the Y direction, and the Z direction.

SUMMARY

However, it is understood that, upon fixing or limiting the components in a limited space by at least two of the above-mentioned fixing assemblies in different directions (that is, the X-Y plane and the Z direction), the problem of insufficient space is encountered. Hence, a problem that the components cannot be effectively fixed or limited in the X direction, the Y direction, and the Z direction is also encountered.

In addition, since the fixing assemblies each is not integrated as a one-piece member but separated into at least two parts for fixing the components, upon the fixing assembly is impacted by an external force, the parts of the fixing assemblies in any direction will still be detached off. Hence, with this fixing manner, the potential risk that these components and their internal elements will be detached off and fall down again still cannot be avoided.

In view of these, according to some embodiments, a communication device comprising a wireless communication module, a frame element, and a fixing assembly is provided. The frame element comprises a bottom plate and a side plate. The bottom plate is connected to the side plate. The side plate comprises a fixing hole. The fixing assembly comprises a first fixing element, and the first fixing element comprises a first connection portion and a first fixing portion. The first connection portion is adapted to be fixed to the wireless communication module. The first fixing portion comprises a first neck portion and a first protruding portion. The first neck portion is adapted to be in the fixing hole, and the first neck portion is connected between the first connection portion and the first protruding portion of the first fixing portion. A dimension of the first protruding portion is greater than a dimension of the first neck portion.

According to some embodiments, the first fixing element further comprises a first buckling portion. The first buckling portion is detachably on the first neck portion. The side plate is between the first connection portion and the first buckling portion, and the side plate is adapted to fix the frame element with the fixing assembly.

According to some embodiments, the fixing assembly further comprises a second fixing element. The second fixing element comprises a second connection portion and a second fixing portion. The second connection portion is adapted to be fixed to the wireless communication module. The second fixing portion is adapted to be fixed to the frame element.

According to some embodiments, the wireless communication module comprises an antenna element and a circuit element. The antenna element is connected to the circuit element. The circuit element is adapted to be connected to a circuit board of the communication device.

In addition, according to some embodiments, a fixing element is provided, and the fixing element is adapted to fix a wireless communication module with a frame element. The fixing element comprises a first connection portion and a first fixing portion. The first fixing portion comprises a first neck portion and a first protruding portion. The first neck portion is connected to the first connection portion and the first protruding portion, and the first neck portion is adapted to be in a fixing hole of the frame element. The first protruding portion is connected to the first neck portion, and a dimension of the first protruding portion is greater than a dimension of the first neck portion. The first connection portion is adapted to be fixed to the wireless communication module, and the first fixing portion is adapted to be fixed to the frame element.

According to some embodiments, the first connection portion comprises a first section and a second section, the first section is in communication with the second section, and a size of the second section is greater than a size of the first section.

To sum up, in some embodiments, the component to be fixed (such as the wireless communication module) is fixed by the fixing element (that is, the first fixing element and/or the second fixing element). Therefore, upon the wireless communication module is impacted by external forces, the components and internal elements thereof can be prevented from being detached off or falling down. In some embodiments, the fixing element (or for example, the first fixing element and/or the second fixing element) not only fixes or limits the components, but also prevents the thickness and the whole volume of the communication device from being increased.

The detailed features and advantages of the instant disclosure are described in detail in the following embodiments, and the content is sufficient to enable any person who is familiar with the relevant art to understand the technical contents of the instant disclosure and implement them accordingly. Based on the disclosed contents of the specification, claim(s) and drawing(s), any person who is familiar with the relevant art can easily understand the purposes and advantages related to the embodiments of the instant disclosure.

DETAILED DESCRIPTION

The following description is supplemented with the drawings to illustrate the embodiments of the instant disclosure more clearly, and the component to be fixed in each of the following embodiments of the instant disclosure is exemplarily illustrated by "a wireless communication module". However, the component to be fixed is not only limited to "the wireless communication module"; instead, a person skilled in the art should appreciate that any component with needs to be fixed are all included in the scope of the instant disclosure.

Figure 1A:
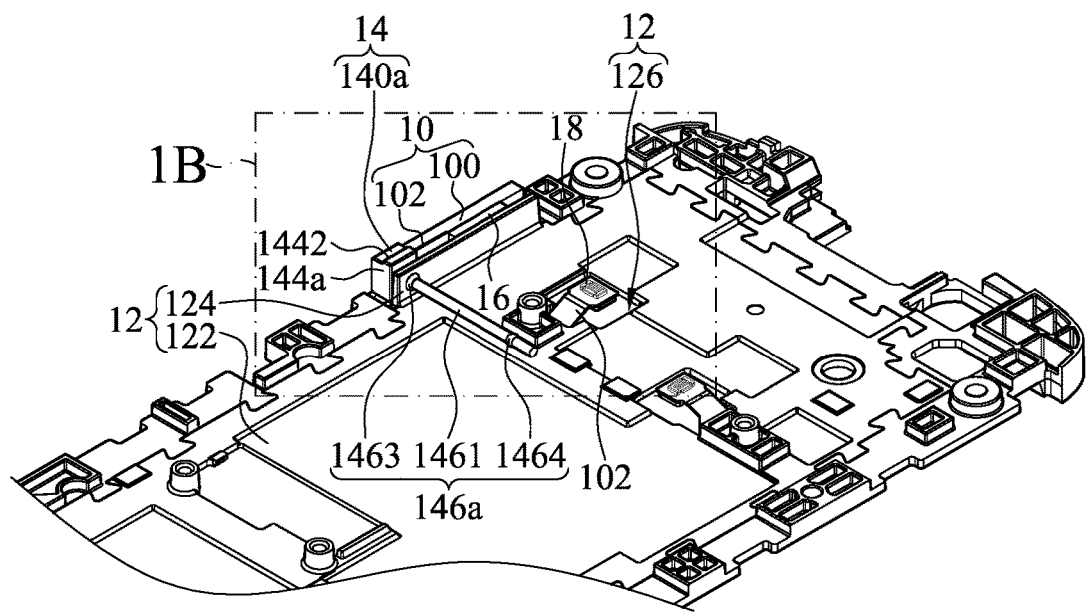
FIG. 1A illustrates a perspective view of a communication device according to some embodiments.
Figure 1B:
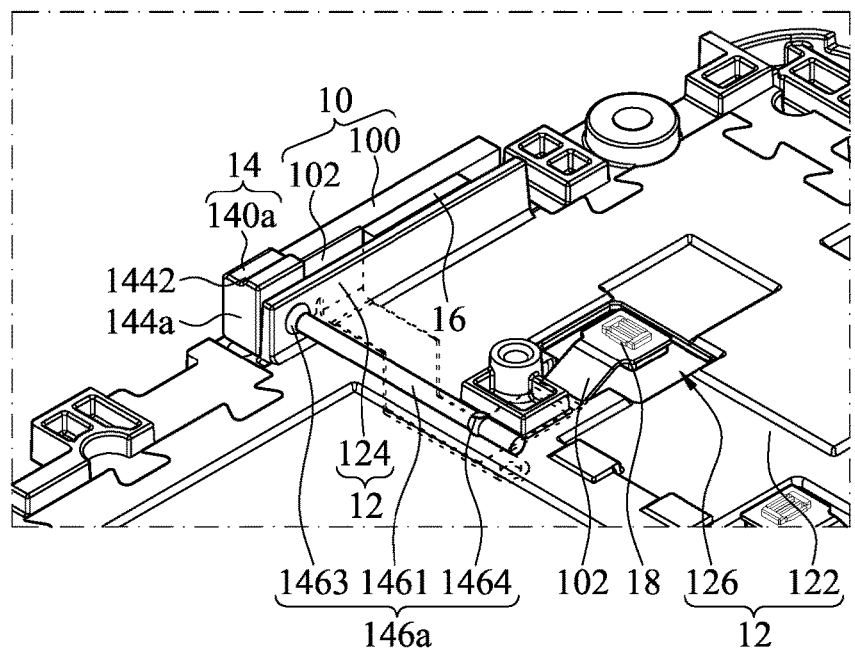
FIG. 1B illustrates an enlarged partial perspective view of the communication device shown in FIG. 1A.
Figure 2A:
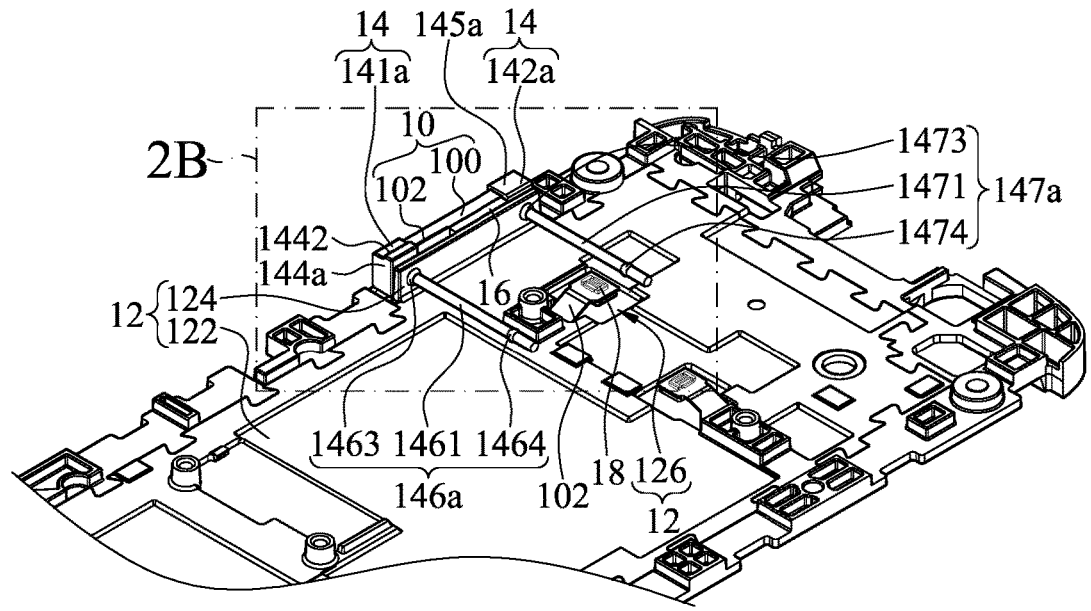
FIG. 2A illustrates a perspective view of a communication device according to some embodiments.
Figure 2B:
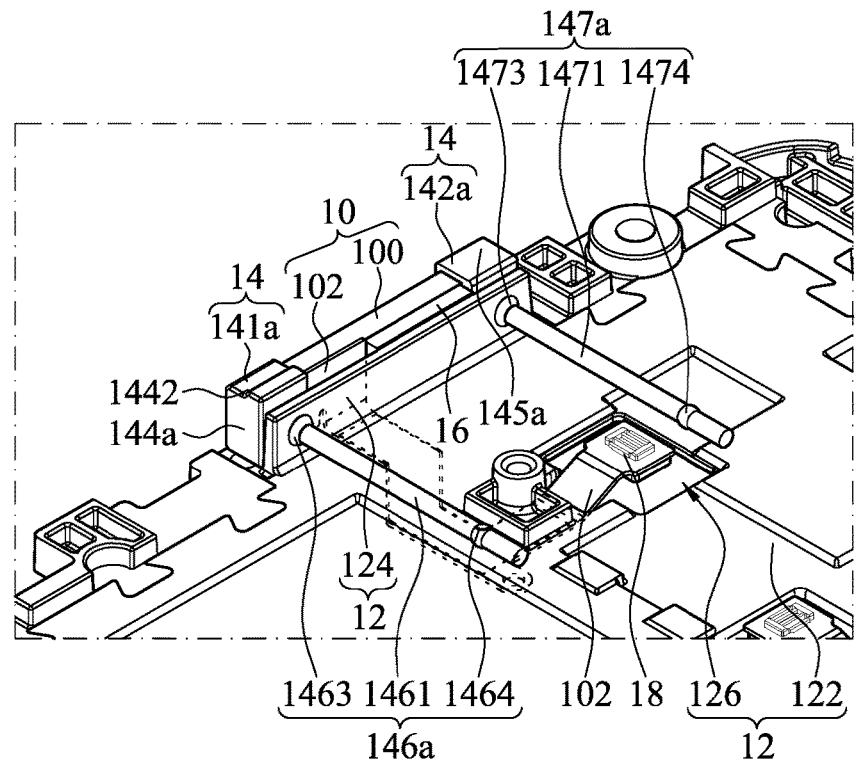
FIG. 2B illustrates an enlarged partial perspective view of the communication device shown in FIG. 2A.
Figure 2C:
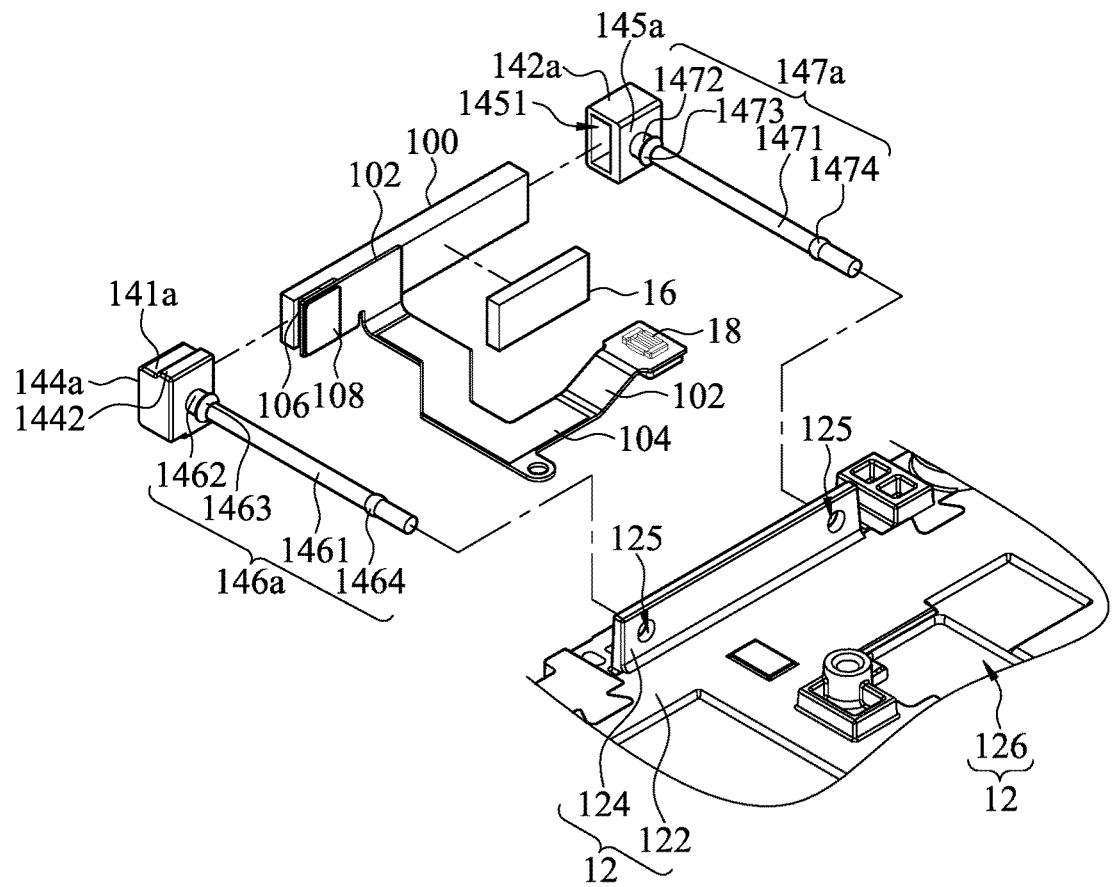
FIG. 2C illustrates a partial exploded view of the communication device shown in FIG. 2A.

Please refer to FIG. 1A, FIG. 1B, FIG. 2A, and FIG. 2C. FIG. 1A illustrates a perspective view of a communication device 1 according to some embodiments, and FIG. 1B illustrates an enlarged partial perspective view of the communication device 1 shown in FIG. 1A. FIG. 2A illustrates a perspective view of a communication device 1 according to some embodiments, and FIG. 2C illustrates a partial exploded view of the communication device 1 shown in FIG. 2A. In FIG. 1A to FIG. 1B, a communication device 1 comprises a wireless communication module 10, a frame element 12, and a fixing assembly 14.

The wireless communication module 10 may be any module capable of receiving and transmitting signals, which is not limited herein. For example, the wireless communication module 10 comprises an antenna element 100 and a circuit element 102. The antenna element 100 is connected to the circuit element 102, and the circuit element 102 is adapted to be connected to a circuit board 18 of the communication device 1. The connection may refer to electrical and/or communication connection, which is not limited herein. Therefore, the antenna element 100 is connected to the circuit board 18 through the circuit element 102, thereby control signals can be transmitted between each other. In FIG. 1B and FIG. 2C, the wireless communication module 10 further comprises a circuit 104 on the circuit element 102. The circuit 104 may be a liquid crystal polymer (LCP) and flexibly disposed on the circuit element 102. Hence, the circuits 104, the antenna element 100, and the circuit element 102 can be together served as a 5G millimeter wave (5G mm wave) antenna that is capable of receiving and transmitting high-frequency signals with low signal losses.

The frame element 12 comprises a bottom plate 122, and the bottom plate 122 comprises a bottom-plate opening 126 on the bottom plate 122. In FIG. 1B, the circuit board 18 of the communication device 1 is on the top side of the bottom plate 122. Hence, the circuit element 102 and the circuit 104 pass through the bottom-plate opening 126 from the bottom side of the bottom plate 122 of the frame element 12, so that the circuit element 102 and the circuit 104 are connected to the circuit board 18. The connection may refer to electrical and/or communication connection, which is not limited herein. It is understood that, as long as the mechanical strength of the frame element 12 can resist general external forces without having severe deformation, the material of the frame element 12 is not limited herein. Therefore, the material of the frame element 12 may be exemplarily at least one selected from the group consisting of metal, alloy, plastic, and composite material.

The fixing assembly 14 comprises a fixing element 140a. The fixing element 140 comprises a first connection portion 144a and a first fixing portion 146a. The first connection portion 144a is adapted to be fixed to the wireless communication module 10, and the first fixing portion 146a is adapted to be fixed to the frame element 12. The fixation may refer to connecting and fixing at least two objects with each other temporarily (for example, detachably) or permanently (for example, inseparably without damage), so that only an acceptable displacement between these objects is generated under this condition. The materials of the first connection portion 144a and the first fixing portion 146a may be the same or different, for example, which may independently be at least one selected from the group consisting of metal, alloy, plastic, and composite material, but is not limited herein. Therefore, the wireless communication module 10 can be fixed with the frame element 12 of the communication device 1 through the fixing assembly 14, thereby avoiding unnecessary relative displacements of the wireless communication module 10 with respect to the frame element 12. Moreover, conditions such as that the internal elements of the wireless communication module 10 (for example, the antenna element 100 and the circuit element 102) are detached off or falling down from the wireless communication module 10 when the communication device 1 is impacted by external forces can be also avoided.

From the above description, according to some embodiments, the fixing assembly 14 just comprises one fixing element (for example, the first fixing element 140a), and the component to be fixed (for example, the wireless communication module 10) can be fixed by the fixing assembly 14 without having unnecessary relative displacements of the wireless communication module 10 with respect to the frame element 12; that is, according to some embodiments, the fixing assembly 14 only comprises one fixing element to achieve the effect of fixing the component to be fixed with the frame element 12.

Next, please refer to FIG. 2A to FIG. 2C. FIG. 2B illustrates an enlarged partial perspective view of the communication device 1 shown in FIG. 2A. Compared with the communication device 1 shown in FIG. 1A and FIG. 1B, the communication device 1 shown in FIG. 2A to FIG. 2C also comprises a fixing assembly 14, and the fixing assembly 14 also comprises a first fixing element 141a. Details of the first fixing element 141a may correspond to those of the fixing element 140a, which is thus not described here again.

Figure 2D:
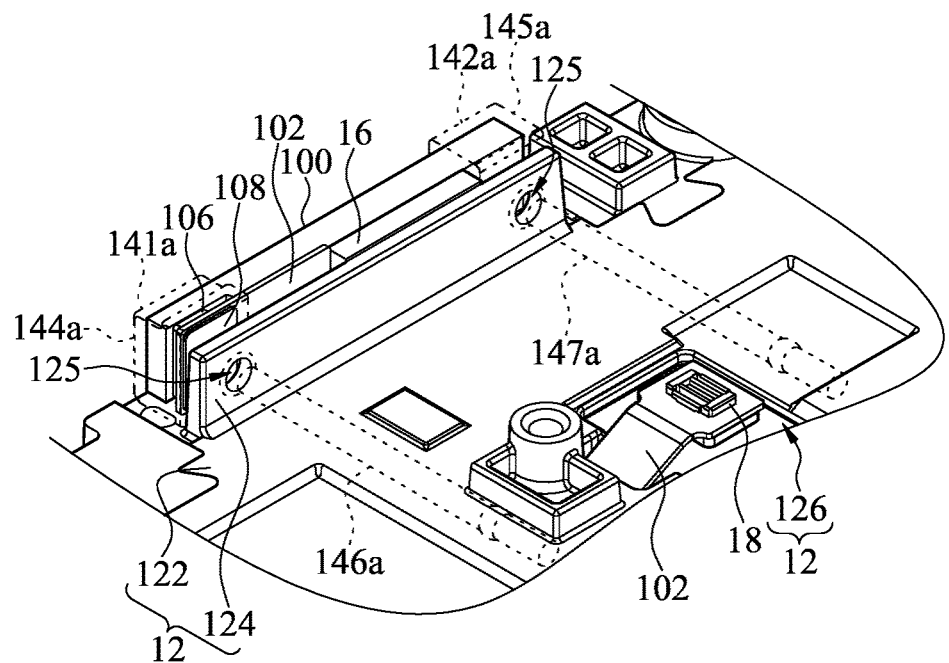
FIG. 2D illustrates a partial perspective view of the communication device shown in FIG. 2A.

Please refer to FIG. 2C to FIG. 2D. FIG. 2D illustrates a partial perspective view of the communication device 1 shown in FIG. 2A. For example, in FIG. 2C to FIG. 2D, the wireless communication module 10 further comprises a connecting element 106. The connecting element 106 is between the antenna element 100 and the circuit element 102 to connect the antenna element 100 with the circuit element 102. The connection may refer to electrical and/or communication connection, which is not limited herein. Therefore, control signals can be transmitted between the antenna element 100 and the circuit element 102 through the connecting element 106. Hence, the wireless communication module 10 can be fixed with the frame element 12 of the communication device 1 through the fixing assembly 14, thereby avoiding unnecessary relative displacements of the wireless communication module 10 with respect to the frame element 12. Moreover, conditions such as that the internal elements of the wireless communication module 10 (for example, the antenna element 100, the circuit element 102, and the connecting element 106) are detached off or falling down from the wireless communication module 10 when the communication device 1 is impacted by external forces can be also avoided. It should be noted that, the communication device 1 shown in FIG. 1A and FIG. 1B may also comprise the connecting element 106, and the communication device 1 shown in FIG. 2A to FIG. 2D is only used for exemplary illustration herein and not to limit the instant disclosure to the specific embodiments.

Alternatively, for another example, in FIG. 2C and FIG. 2D, the communication device 1 further comprises a reinforcing element 108. The reinforcing element 108 is between the wireless communication module 10 and the fixing assembly 14, and the defects of the mechanical properties of the wireless communication module 10 can be thus reinforced. For example, the reinforcing element 108 is on the circuit element 102 of the wireless communication module 10, and the defects of the mechanical properties of the circuit element 102 (for example, the circuit element 102 may be cracked easily and/or may have a poorer bending resistance owing to its relatively thinner thickness) may be thus reinforced. Therefore, the wireless communication module 10 can be fixed with the frame element 12 of the communication device 1 through the fixing assembly 14, thereby avoiding unnecessary relative displacements of the wireless communication module 10 with respect to the frame element 12. Moreover, conditions such as that the internal elements of the wireless communication module 10 (for example, the antenna element 100, the circuit element 102, and the reinforcing element 108) are detached off or falling down from the wireless communication module 10 when the communication device 1 is impacted by external forces can be also avoided. It should be noted that, the communication device 1 shown in FIG. 1A and FIG. 1B may also comprise the reinforcing element 108, and the communication device 1 shown in FIG. 2A to FIG. 2D is only used for exemplary illustration herein and not to limit the instant disclosure to the specific embodiments.

Alternatively, for yet another example, in FIG. 2B to FIG. 2D, the communication device 1 further comprises a heat dissipation element 16. The heat dissipation element 16 is between the wireless communication module 10 and the frame element 12. In some embodiments, the heat dissipation element 16 may even be used to connect the wireless communication module 10 with the frame element 12. The connection may refer to fixing the components with each other detachably or permanently, or may even refer to a connection that is related to thermal conduction and/or electrical conduction, which is not limited herein. Therefore, the wireless communication module 10 can be fixed with the frame element 12 of the communication device 1 through the fixing assembly 14, thereby avoiding unnecessary relative displacements of the wireless communication module 10 with respect to the frame element 12. Moreover, conditions such as that the internal elements of the wireless communication module 10 (for example, the antenna element 100 and the circuit element 102) and the internal elements fixed between the wireless communication module 10 and the frame element 12 (for example, the heat dissipation element 16) are detached off or falling down from the wireless communication module 10 and the frame element 12 when the communication device 1 is impacted by external forces can be also avoided. It should be noted that, the communication device 1 shown in FIG. 1A and FIG. 1B may also comprise the heat dissipation element 16, and the communication device 1 shown in FIG. 2A to FIG. 2D is only used for exemplary illustration herein and not to limit the instant disclosure to the specific embodiments.

Further, for yet another example, in FIG. 2B to FIG. 2D, the heat dissipation element 16 is between the wireless communication module 10 and the frame element 12, and the heat dissipation element 16 has a compressible amount. Therefore, through the fixation between the wireless communication module 10 and the frame element 12 by the fixing assembly 14, a predetermined compressed amount of the heat dissipation element 16 can be generated, thereby changing (for example, decreasing) the thermal resistance of the heat dissipation element 16. Therefore, the thermal conductivity and the heat dissipation capacity of the heat dissipation element 16 are enhanced. Moreover, by adjusting the fixing tightness between the fixing assembly 14 and the wireless communication module 10 (for example, configuring the material of the fixing assembly 14 as a material with a greater shrinkage rate, and thus resulting in the fixing assembly to have a larger compressed amount; preferably, in some embodiments, the material of the fixing assembly 14 is rubber material), the heat dissipation element 16 with a better thermal conductivity and a better heat dissipation capacity can be provided.

Figure 2E:
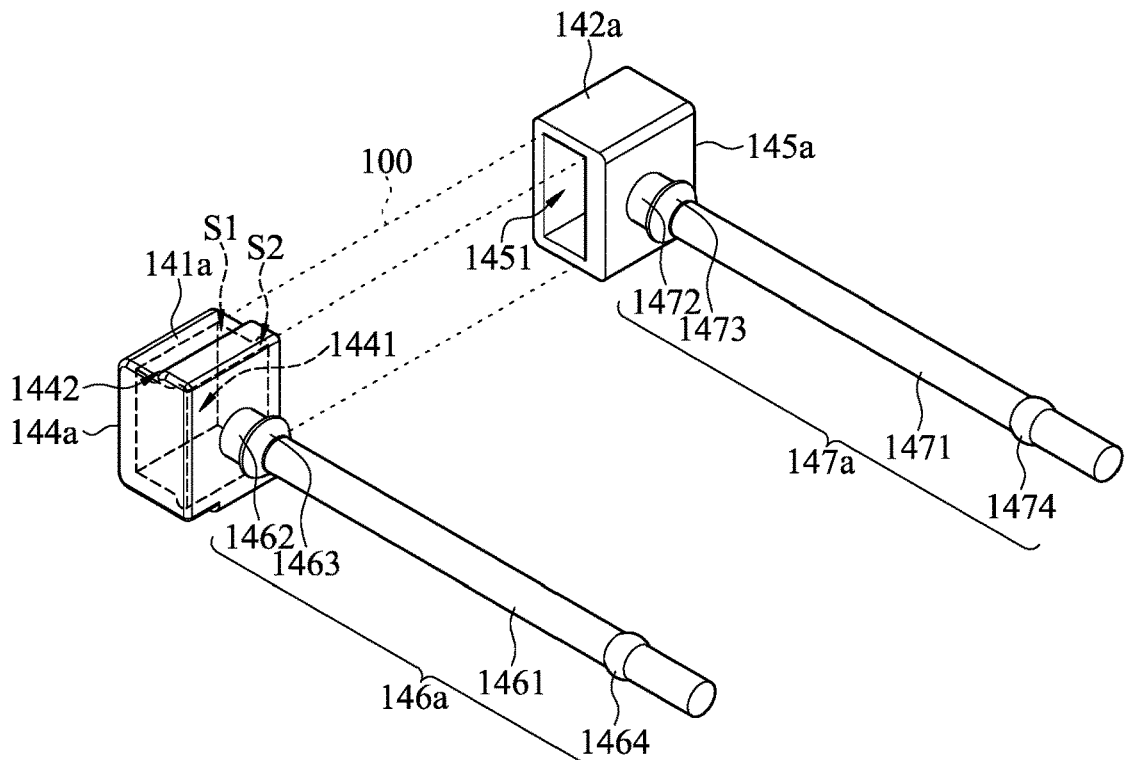
FIG. 2E illustrates a perspective view of the first fixing element and the second fixing element shown in FIG. 2A.

Please refer to FIG. 2C and FIG. 2E. FIG. 2E illustrates a perspective view of the first fixing element 141a and the second fixing element 142a shown in FIG. 2A. In FIG. 2C and FIG. 2E, the first connection portion 144a of the first fixing element 141a comprises a first containing portion 1441. The first containing portion 1441 is substantially matched with the wireless communication module 10 to contain an end portion of the wireless communication module 10. The term "substantially matched" may refer to a certain containing relationship between two matched components, and a part of or the whole of one of the two components is contained in the other component, so that only an acceptable relative displacement can be generated between the two matched components after one of the two components is contained in the other component. Therefore, the wireless communication module 10 can be fixed with the frame element 12 of the communication device 1 through the fixing assembly 14, thereby avoiding unnecessary relative displacements of the wireless communication module 10 with respect to the frame element 12. Moreover, conditions such that the internal elements of the wireless communication module 10 (for example, the antenna element 100 and the circuit element 102) are detached off or falling down from the wireless communication module 10 when the communication device 1 is impacted by external forces can be also avoided. Moreover, through such fixing manner, the entire outer portion of the wireless communication module 10 is not necessarily fixed by the fixing assembly 14, thereby reducing the amount of the material of the fixing assembly 14 (or for example, the first fixing element 141a and/or the second fixing element 142a). Hence, the overall weight and the material costs of the communication device 1 can both be reduced.

Further, in some embodiments, the first connection portion 144a of the first fixing element 141a may be adjusted based on the dimensions of the components to be contained or fixed in the first connection portion 144a, so that the components are contained and fixed by the first connection portion 144a. Moreover, the arrangement and the dimension design of the first connection portion 144a herein are only used for exemplary illustration and not to limit the instant disclosure to the specific embodiments. According to some embodiments, in FIG. 2E, the first connection portion 144a of the first fixing element 141a further comprises a convex portion 1442. The convex portion 1442 protrudes from a side of the first connection portion 144a. In the aspect as an internal structure or a side-view structure of the convex portion 1442, the first containing portion 1441 of the first fixing element 141a comprises a first section S1 and a second section S2. The first section S1 and the second section S2 are in communication with each other, and a size (for example, a height) of the second section S2 is greater than a size (for example, a height) of the first section S1. In other words, in these embodiments, the convex portion 1442 (corresponding to the second section S2) protrudes and thus is higher than the first connection portion 144a of the first fixing element 141a (corresponding to the first section S1). Therefore, a part of or the whole of the components to be fixed (for example, the wireless communication module 10) that have different dimensions (for example, heights) can be contained in the first containing portion 1441 of the first fixing element 141a. Hence, through such fixing manner, unnecessary damages to those components to be fixed with different dimensions (for example, heights) can be avoided. For example, in FIG. 2D and FIG. 2E, the heights of the circuit element 102 and the reinforcing element 108 of the wireless communication module 10 are relatively greater than the heights of the antenna element 100 and the connecting element 106. Therefore, the second section S2 (with a height greater than the height of the first section S1) of the first containing portion 1441 can be adapted to contained a part of or the whole of the circuit element 102 and the reinforcing element 108 with a larger size (for example, with a larger height); while the first section S1 (with a height less than the height of the second section S2) of the first containing portion 1441 can be adapted to contain a part of or the whole of the antenna element 100 and the connecting element 106 with a smaller size (for example, with a shorter height). Hence, according to some embodiments, the components with different dimensions (for example, the antenna element 100, the circuit element 102, the connecting element 106, and the reinforcing element 108) can all be contained in the same first fixing element 141a at the same time, and two or more first fixing elements 141a are no longer necessarily needed to contain a part of or the whole of components with different dimensions (for example, heights) at the same time. It should be noted that, the fixing element 140a shown in FIG. 1A and FIG. 1B may also comprise the convex portion 1442, and the first fixing element 141a shown in FIG. 2A to FIG. 2E is only used for exemplary illustration herein and not to limit the instant disclosure to the specific embodiments.

Figure 2F:
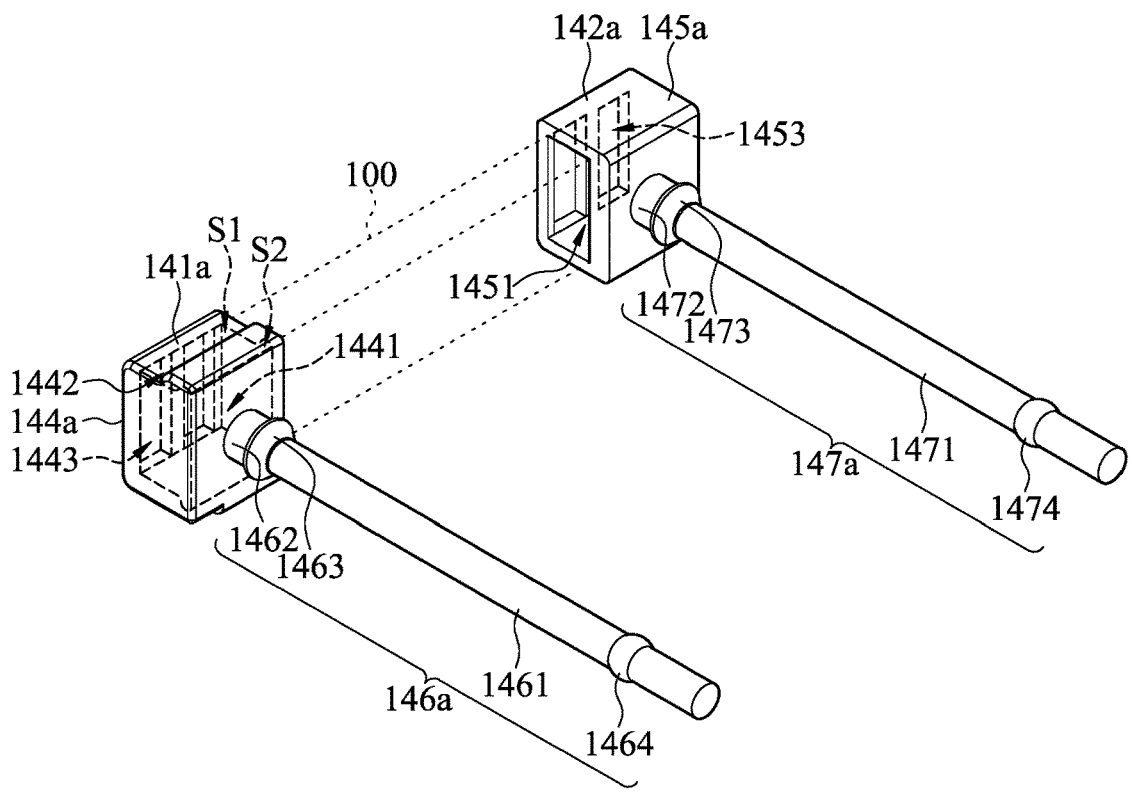
FIG. 2F illustrates a perspective view of the first fixing element and the second fixing element shown in FIG. 2A.

Please refer to FIG. 2F. FIG. 2F illustrates a perspective view of the first fixing element 141a and the second fixing element 142a shown in FIG. 2A. According to some embodiments, the first connection portion 144a comprises a first hollow portion 1443. The first hollow portion 1443 is on the first connection portion 144a, and the first hollow portion 1443 is disposed away from the frame element 12. The first hollow portion 1443 may be one or more apertures or holes with other shapes defined through the first connection portion 144a. The first hollow portion 1443 may even be one or more slots or openings with other shapes that have a relative larger hollow area. Therefore, through the arrangement of the first hollow portion 1443, the exposure area of the component to be fixed and contained in the first connection portion 144a can be relatively increased without covering the entire outer portion of the component to be fixed. Moreover, it should be noted that, some components to be fixed (for example, the wireless communication module 10) are needed to be exposed to an environment capable of receiving and/or transmitting signals as much as possible, thereby preventing the antenna capability of these components from being reduced or affected. In these embodiments, through the configuration of the first hollow portion 1443, not only the original fixing effect of the first fixing element 141a can be achieved, but also the components of the wireless communication module 10 that are capable of receiving and/or transmitting signals can be prevented from being covered by the first connection portion 144a completely. Hence, with the configuration of the first hollow portion 1443, the loss to the original antenna capability of the components can be avoided or minimized as much as possible. It should be noted that, the first connection portion 144a of the fixing element 140a shown in FIG. 1A and FIG. 1B may also comprise the first hollow portion 1443, and the first connection portion 144a of the first fixing element 141a shown in FIG. 2A to FIG. 2E is only used for exemplary illustration herein and not to limit the instant disclosure to the specific embodiments.

For example, in FIG. 2F, two first hollow portions 1443 are disposed on a side of the first connection portion 144a of the first fixing element 141a, and the side of the first connection portion 144a is away from the first fixing portion 146a (or the frame element 12, as shown in FIG. 2B); while a part of the first connection portion 144a that is not hollowed out still exists between the two first hollow portions 1443. Therefore, in this embodiment, under the condition that the wireless communication module 10 is exposed to its maximum extent, by adjusting the configuration of the first hollow portion 1443, the mechanical strength of the first connection portion 144a can be still maintained without affecting the overall fixing effect of the first fixing element 141a.

Please refer to FIG. 2A to FIG. 2D again. According to some embodiments, the frame element 12 comprises a bottom plate 122 and a side plate 124. The side plate 124 is connected to the bottom plate 122, and the side plate 124 comprises a fixing hole 125. The connection may refer to fixing the components with each other detachably or permanently, or may even refer to a connection that is related to thermal conduction and/or electrical conduction, which is not limited herein. The frame element 12 may comprise one or more side plates 124. For example, in FIG. 2A to FIG. 2D, the frame element 12 comprises one side plate 124. The side plate 124 is correspondingly disposed on a side of the wireless communication module 10, and the side plate 124 has two fixing holes 125 respectively corresponding to two end portions of the wireless communication module 10. Alternatively, in some embodiments, the frame element 12 comprises two separated side plates 124 (not shown). The two side plates 124 are respectively disposed on two end portions of the wireless communication module 10. Each of the two side plates 124 has a fixing hole 125, and the fixing holes 125 are respectively disposed on two end portions of the wireless communication module 10. It should be noted that, the frame element 12 shown in FIG. 1A and FIG. 1B may also comprise the bottom plate 122 and the side plate 124, and the frame element 12 shown in FIG. 2A to FIG. 2D is only used for exemplary illustration herein and not to limit the instant disclosure to the specific embodiments.

Please refer to FIG. 2E again. The first fixing portion 146a of the first fixing element 141a comprises a first neck portion 1462 and a first protruding portion 1463. The first neck portion 1462 is disposed in the fixing hole 125, and the first neck portion 1462 is connected between the first connection portion 144a and the first protruding portion 1463. The dimension of the first protruding portion 1463 may be greater than the dimension of the first neck portion 1462. For example, the outer diameter of the first protruding portion 1463 may be greater than the outer diameter of the first neck portion 1462. The dimension of the first protruding portion 1463 may be greater than the inner dimension of the fixing hole 125. For example, the outer diameter of the first protruding portion 1463 may be greater than the inner diameter of the fixing hole 125. The connection may refer to fixing the components with each other detachably or permanently, or may even refer to a connection that is related to thermal conduction and/or electrical conduction, which is not limited herein. Therefore, in this embodiment, the first neck portion 1462 of the first fixing portion 146a is disposed in the fixing hole 125 of the frame element 12, and the first protruding portion 1463 is correspondingly configured with the first connection portion 144a. Hence, the side plate 124 can be limited between the first connection portion 144a and the first protruding portion 1463. Accordingly, by using the first fixing portion 146a to fix the frame element 12 with the fixing assembly 14, the wireless communication module 10 can be fixed with the frame element 12 of the communication device 1, thereby avoiding unnecessary relative displacements of the wireless communication module 10 with respect to the frame element 12. Moreover, conditions such as that the internal elements of the wireless communication module 10 (for example, the antenna element 100 and the circuit element 102) are detached off or falling down from the wireless communication module 10 when the communication device 1 is impacted by external forces can be also avoided. It should be noted that, the first fixing portion 146a of the fixing element 140a shown in FIG. 1A and FIG. 1B may also comprise the first neck portion 1462 and the first protruding portion 1463, and the first fixing element 141a of the first fixing portion 146a shown in FIG. 2A to FIG. 2D is only used for exemplary illustration herein and not to limit the instant disclosure to the specific embodiments.

In FIG. 2E, according to some embodiments, the first fixing portion 146a of the first fixing element 141a further comprises a first guiding portion 1461. The first guiding portion 1461 is connected to the first protruding portion 1463, and the first guiding portion 1461 is disposed away from the first connection portion 144a. The connection may refer to fixing the components with each other detachably or permanently, or may even refer to a connection that is related to thermal conduction and/or electrical conduction, which is not limited herein. In FIG. 2E, the first fixing portion 146a comprises a first guiding portion 1461, and the first guiding portion 1461 is a pillar (for example, a cylindrical pillar) extending from the first protruding portion 1463 toward a direction away from the first connection portion 144a. Therefore, through the arrangement of the first guiding portion 1461, during the process of assembling or fixing the fixing assembly 14 to the components through manual or machine operations, more points of application that are operable can be provided, thereby enhancing the flexibility and convenience for the operations. Moreover, through the arrangement of the first guiding portion 1461, damages of the communication device 1 due to the inconvenience of the above operation can be also avoided. It should be noted that, the first fixing portion 146a of the fixing element 140a shown in FIG. 1A and FIG. 1B may also comprise the first guiding portion 1461, and the first fixing element 141a of the first fixing portion 146a shown in FIG. 2A to FIG. 2F is only used for exemplary illustration herein and not to limit the instant disclosure to the specific embodiments.

Further, in FIG. 2E, according to some embodiments, the first fixing portion 146a of the first fixing element 141a further comprises a first auxiliary portion 1464. The first auxiliary portion 1464 is on the first guiding portion 1461, and the position of the first auxiliary portion 1464 on the first guiding portion 1461 is not limited. The configuration of the first auxiliary portion 1464 may correspond to the configuration of the first protruding portion 1463; that is, in this embodiment, the dimension of the first auxiliary portion 1464 may be greater than the dimension of the first guiding portion 1461. For example, the outer diameter of the first auxiliary portion 1464 may be greater than the outer diameter of the first guiding portion 1461. Through the arrangement of the first auxiliary portion 1464, the friction force resulted from holding the first guiding portion 1461 and the first auxiliary portion 1464 through manual or machine operations can be enhanced. Therefore, during the process of assembling or fixing the fixing assembly 14 to the components through manual or machine operations, more points of application that are operable can be provided, thereby enhancing the flexibility and convenience for the operations. Preferably, in some embodiments, the first auxiliary portion 1464 is disposed away from the first connection portion 144a. Hence, by disposing the first auxiliary portion 1464 away from the first connection portion 144a and on an end portion of the first guiding portion 1461, it is more beneficial to assemble or fix the fixing assembly 14 through manual or machine operations. Therefore, the assembling and the fixing through manual or machine operations can be achieved with reduced efforts, thereby enhancing the flexibility and convenience of the above operation. It should be noted that, the first fixing portion 146a of the fixing element 140a shown in FIG. 1A and FIG. 1B may also comprise the first auxiliary portion 1464, and the first fixing element 141a of the first fixing portion 146a shown in FIG. 2A to FIG. 2F is only used for exemplary illustration herein and not to limit the instant disclosure to the specific embodiments.

Figure 4A:
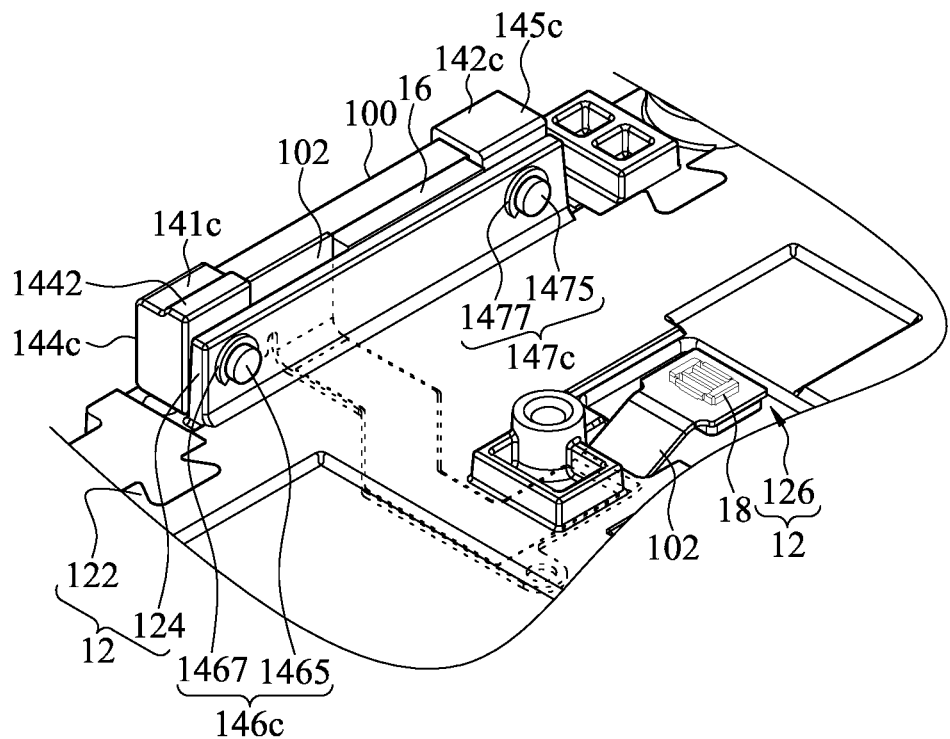
FIG. 4A illustrates an enlarged partial perspective view of a communication device according to some embodiments.
Figure 4B:
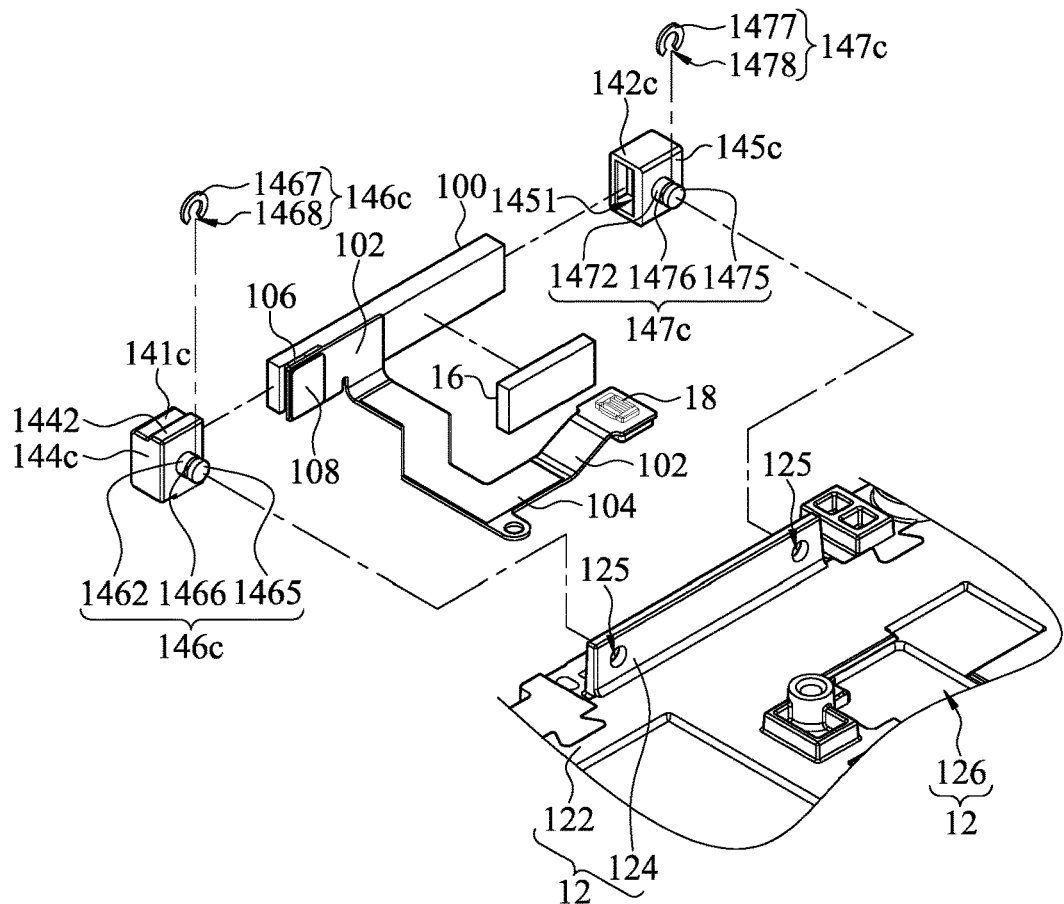
FIG. 4B illustrates a partial exploded view of the communication device shown in FIG. 4A.
Figure 4C:
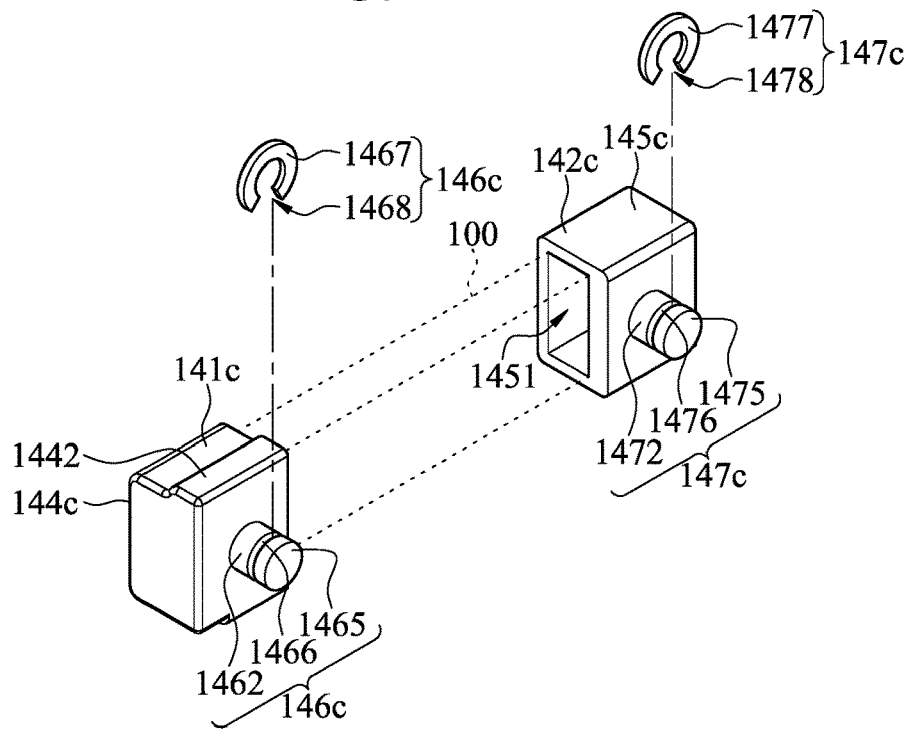
FIG. 4C illustrates a perspective view of the first fixing element and the second fixing element shown in FIG. 4A.

Please refer to FIG. 4A to FIG. 4C. FIG. 4A illustrates an enlarged partial perspective view of a communication device 1 according to some embodiments. FIG. 4B illustrates a partial exploded view of the communication device 1 shown in FIG. 4A. FIG. 4C illustrates a perspective view of the first fixing element 141c and the second fixing element 142c shown in FIG. 4A. Compared with the first fixing portion 146a of the first fixing element 141a shown in FIG. 2A to FIG. 2E (or the first fixing portion 146a of the fixing element 140a shown in FIG. 1A and FIG. 1B), the first fixing portion 146c of the first fixing element 141c shown in FIG. 4A to FIG. 4C comprises a first buckling portion 1467 and a first slot portion 1466. The first slot portion 1466 is disposed correspondingly to the first buckling portion 1467. For example, the first slot portion 1466 is disposed on the first neck portion 1462 circumferentially (for example, configured as an annular slot) or partially (for example, configured as a sector slot), and the dimension of the first slot portion 1466 is less than the dimension of the first neck portion 1462. For example, the outer diameter of the first slot portion 1466 is less than the outer diameter of the first neck portion 1462. The first buckling portion 1467 is detachably disposed on the first neck portion 1462. For example, the first buckling portion 1467 comprises a first opening portion 1468, so that the first buckling portion 1467 is formed as a saddle-like (that is, inverted U-shape) structure. Therefore, the first buckling portion 1467 is further detachably disposed on the first neck portion 1462 through the first opening portion 1468 (for example, the first buckling portion 1467 is detachably buckled to the first slot portion 1466). Hence, the side plate 124 can be disposed between the first connection portion 144c and the first buckling portion 1467 by disposing the first slot portion 1466 in the fixing hole 125, and the side plate 124 and the first neck portion 1462 are fixed through the first buckling portion 1467. Therefore, the wireless communication module 10 can be fixed with the frame element 12 of the communication device 1 through the fixing assembly 14, thereby avoiding unnecessary relative displacements of the wireless communication module 10 with respect to the frame element 12. Moreover, conditions such as that the internal elements of the wireless communication module 10 (for example, the antenna element 100 and the circuit element 102) are detached off or falling down from the wireless communication module 10 when the communication device 1 is impacted by external forces can be also avoided.

Further, in FIG. 4A to FIG. 4C, the first fixing portion 146c of the first fixing element 141c further comprises a first end portion 1465. The configuration of the first end portion 1465 may correspond to the configuration of the first protruding portion 1463 (as shown in FIG. 2A to FIG. 2E). The dimension of the first end portion 1465 is greater than the dimension of the first slot portion 1466. For example, the outer diameter of the first end portion 1465 is greater than the outer diameter of the first slot portion 1466. The dimension of the first end portion 1465 may be greater than or equal to the dimension of the first neck portion 1462. For example, the outer diameter of the first end portion 1465 may be greater than or equal to the outer diameter of the first neck portion 1462. Therefore, in this embodiment, the first neck portion 1462 of the first fixing portion 146c is disposed in the fixing hole 125 of the frame element 12, and the first connection portion 144c is correspondingly configured with the first end portion 1465. Hence, the side plate 124 can be limited between the first connection portion 144c and the first end portion 1465 by disposing Accordingly, by using the first fixing portion 146c to fix the frame element 12 with the fixing assembly 14, the wireless communication module 10 can be fixed with the frame element 12 of the communication device 1, thereby avoiding unnecessary relative displacements of the wireless communication module 10 with respect to the frame element 12. Moreover, conditions such as that the internal elements of the wireless communication module 10 (for example, the antenna element 100 and the circuit element 102) are detached off or falling down from the wireless communication module 10 when the communication device 1 is impacted by external forces can be also avoided.

Furthermore, the fixing assembly 14 may also comprise more than one fixing element. Please refer to FIG. 2A to FIG. 2E again. In the fixing assembly 14 shown in FIG. 2A to FIG. 2E, the fixing assembly 14 comprises a first fixing element 141a and a second fixing element 142a. The first fixing element 141a (comprising a first connection portion 144a and a first fixing portion 146a) and the second fixing element 142a (comprising a second connection portion 145a and a second fixing portion 147a) may be configured similar to each other but mirrored (that is, parts of the first fixing element 141a are configured to be side-to-side or upside-down from corresponding parts of the second fixing element 142a); alternatively, in some embodiments, the first fixing element 141a and the second fixing element 142a may be configured differently as long as the first fixing element 141a and the second fixing element 142a are capable of respectively containing the two end portions of the wireless communication module 10. In other words, in this embodiment, the configuration of the second connection portion 145a may correspond to the configuration of the first connection portion 144a, and the configuration of the second containing portion 1451 and the second hollow portion 1453 may respectively correspond to the configuration of the first containing portion 1441 and the first hollow portion 1443, which is thus not described here again. Further, the configuration of the second fixing portion 147a may correspond to the configuration of the first fixing portion 146a, and the configurations of the second guiding portion 1471, the second neck portion 1472, the second protruding portion 1473, and the second auxiliary portion 1474 may respectively correspond to the configurations of the first guiding portion 1461, the first neck portion 1462, the first protruding portion 1463, and the first auxiliary portion 1464, which are thus not described here again. Hence, compared with the fixation with only one first fixing element 141a (or one fixing element 140a), the wireless communication module 10 can be fixed to the frame element 12 of the communication device 1 more stably through the fixation with two or more fixing elements (comprising the first fixing element 141a and the second fixing element 142a), thereby avoiding unnecessary relative displacements of the wireless communication module 10 with respect to the frame element 12.

In some embodiments, the first connection portion 144a of the first fixing element 141a and the second connection portion 145a of the second fixing element 142a may be independently adjusted based on the dimensions of the components to be contained or fixed, so that the components can be contained and fixed by the first connection portion 144a and/or the second connection portion 145a. Moreover, the arrangement and the dimension design of the first connection portion 144a and/or the second connection portion 145a are only used for exemplary illustration herein and not to limit the instant disclosure to the specific embodiments. For example, in FIG. 2E, the configurations of the first connection portion 144a and the second connection portion 145a are similar to each other but mirrored, and the first connection portion 144a further has a convex portion 1442 (that is, the second section S2 with a greater height) while the second connection portion 145a does not have a convex portion 1442. On the other hands, the configurations of the first fixing portion 146a and the second fixing portion 147a may be similar to each other but mirrored, which is not affected by the configurations of the first connection portion 144a and the second connection portion 145a. Hence, end potions of the components with different dimensions (for example, the component may be the antenna element 100, the circuit element 102, the connecting element 106, the reinforcing element 108, and combinations thereof; the dimension may be the height) can be contained in the same first fixing element 141a, and the other end portions of the components with different dimensions can be contained in the same second fixing element 142a (for example, the component may be the antenna element 100, the heat dissipation element 16, and combinations thereof; the dimension may be the height and may be the same as or different from the dimension(s) of the components contained in the first fixing element 141a). Therefore, in this embodiments, two or more first fixing elements 141a and two or more second fixing element 142a are no longer necessarily needed to contain the components with different dimensions (for example, heights) at the same time.

Please refer to FIG. 2F again. The second connection portion 145a of the second fixing element 142a may further comprises a second hollow portion 1453. The configuration of the second hollow portion 1453 of the second fixing element 142a may correspond to the configuration of the first hollow portion 1443 of the fixing element 140a or the first fixing element 141a, which is thus not described here again. Moreover, even though the two end portions of the wireless communication module 10 are respectively contained in the first containing portion 1441 of the first connection portion 144a and the second containing portion 1451 of the second connection portion 145a, due to the configurations of the first hollow portion 1443 and the second hollow portion 1453, not only the original fixing effect of the first connection portion 144a and the second connection portion 145a can be achieved, but also the components of the wireless communication module 10 that are capable of receiving and/or transmitting signals can be prevented from being covered by the first connection portion 144a and the second connection portion 145a completely. Hence, with the configuration of the first hollow portion 1443 and the second hollow portion 1453, the two end portions of the wireless communication module 10 can be fixed with the loss to the original antenna capability of the components avoided or minimized as much as possible.

Figure 3A:
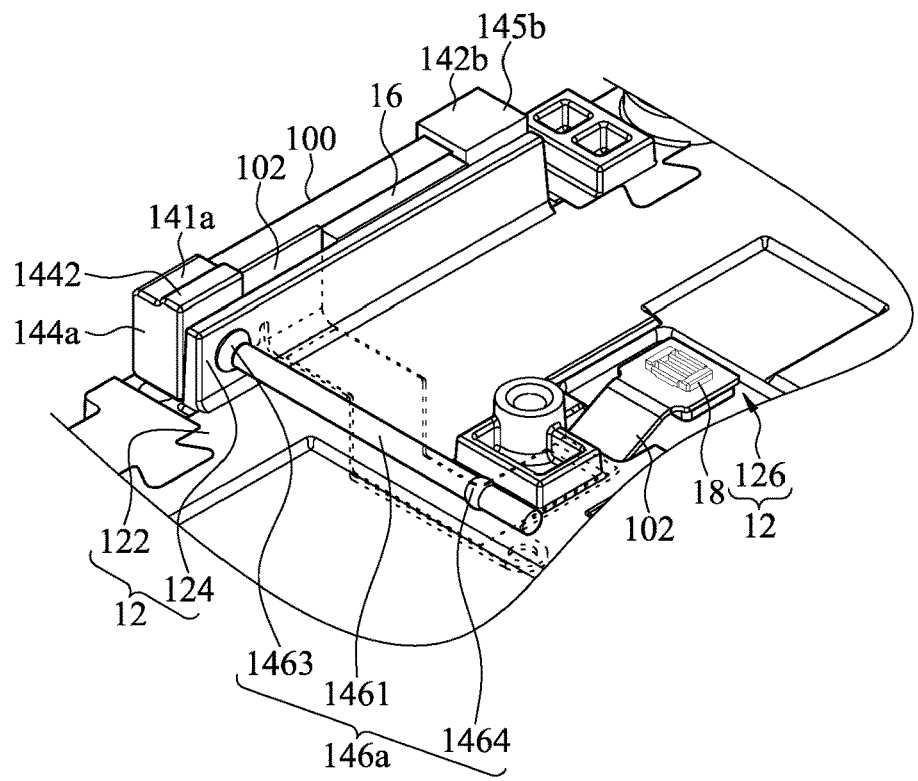
FIG. 3A illustrates an enlarged partial perspective view of a communication device according to some embodiments.
Figure 3B:
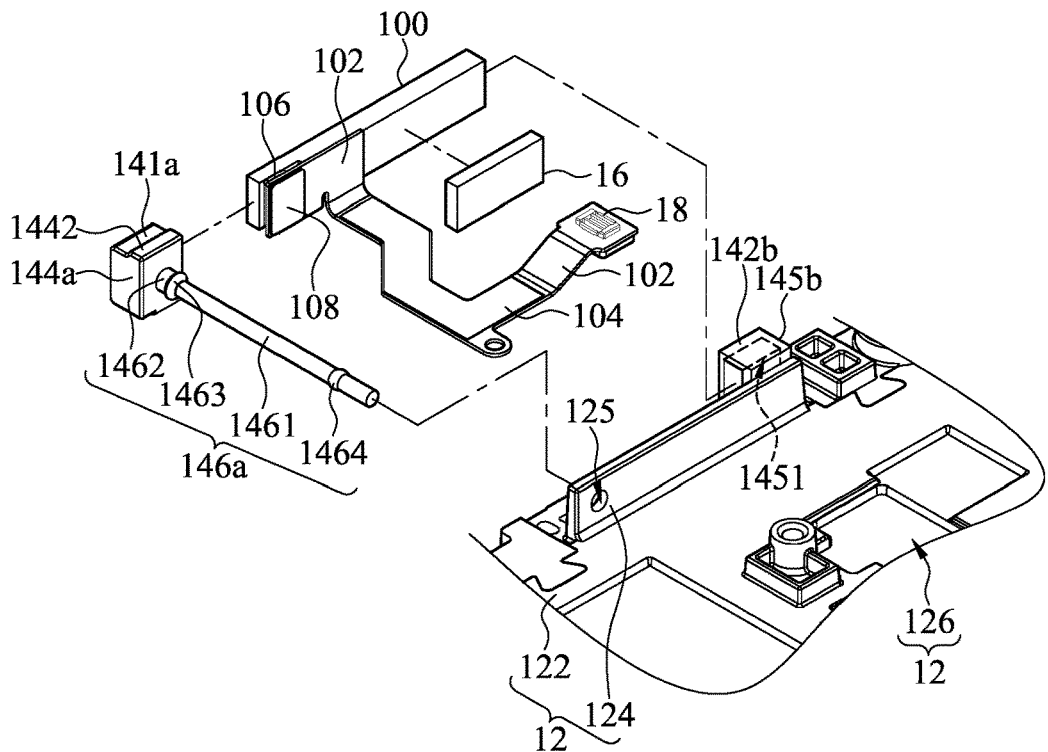
FIG. 3B illustrates a partial exploded view of the communication device shown in FIG. 3A.
Figure 3C:
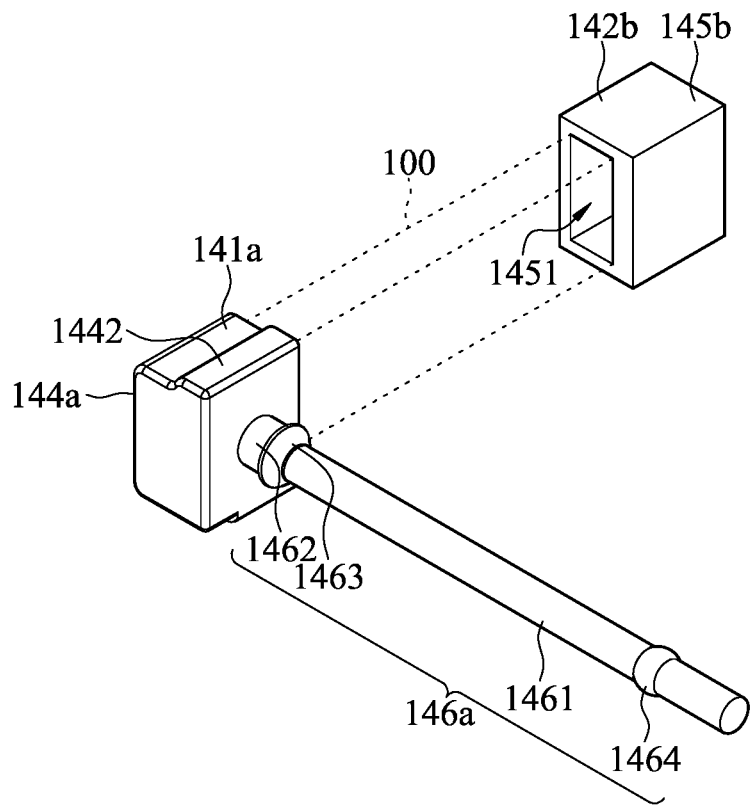
FIG. 3C illustrates a perspective view of the first fixing element and the second fixing element shown in FIG. 3A.

Please refer to FIG. 3A to FIG. 3C. FIG. 3A illustrates an enlarged partial perspective view of a communication device 1 according to some embodiments. FIG. 3B illustrates a partial exploded view of the communication device 1 shown in FIG. 3A. FIG. 3C illustrates a perspective view of the first fixing element 141a and the second fixing element 142b shown in FIG. 3A. Compared with the first fixing element 141a shown in FIG. 2A to FIG. 2E (or the fixing element 140a shown in FIG. 1A and FIG. 1B), the first fixing element 141a shown in FIG. 3A to FIG. 3C may correspond to the first fixing element 141a shown in FIG. 2A to FIG. 2E (or the fixing element 140a shown in FIG. 1A and FIG. 1B), and the structural features of the first fixing element 141a may be referred to those of the first fixing element 141a or the fixing element 140a, which is thus not described here again. Further compared with the second fixing element 142a shown in FIG. 2A to FIG. 2E, the second fixing element 142b shown in FIG. 3A to FIG. 3C is different from the second fixing element 142a shown in FIG. 2A to FIG. 2E. The second fixing element 142b comprises a second connection portion 145b and the second containing portion 1451 of the second fixing element 142b (which may correspond to the second connection portion 145a and the second containing portion 1451 of the second fixing element 142ba), but the second fixing element 142b is devoid of the second fixing portion 147a. Moreover, the second fixing element 142 is directly or indirectly connected to the bottom plate 122 or the side plate 124 of the frame element 12. The connection may refer to fixing the components with each other detachably or permanently, or may even refer to the connection that is related to thermal conduction and/or electrical conduction, which is not limited herein. For example, the second fixing element 142b as well as the bottom plate 122 and/or the side plate 124 are integrally formed, or the second fixing element 142b is detachably connected to the bottom plate 122 and/or the side plate 124 by screws, bolts, etc., which is not limited herein. Hence, compared with the fixation with only one first fixing element 141a (or one fixing element 140a), the wireless communication module 10 can be fixed to the frame element 12 of the communication device 1 more stably through the fixation with two or more fixing elements (comprising the first fixing element 141a and the second fixing element 142b), thereby avoiding unnecessary relative displacements of the wireless communication module 10 with respect to the frame element 12. Furthermore, the other features of the communication device 1 shown in FIG. 3A to FIG. 3C may correspond to those of the communication device 1 shown in FIG. 2A to FIG. 2F, which is thus not described here again.

Please refer to FIG. 4A to FIG. 4C again. Compared with the first fixing element 141a and the second fixing element 142a shown in FIG. 2A to FIG. 2E, the first fixing element 141c shown in FIG. 4A to FIG. 4C comprises a first buckling portion 1467 and a first slot portion 1466 corresponding to the first buckling portion 1467, and the second fixing element 142c shown in FIG. 4A to FIG. 4C comprises a second buckling portion 1477 and a second slot portion 1476 corresponding to the second buckling portion 1477. Moreover, the first fixing element 141c and the second fixing element 142c further respectively comprise a first end portion 1465 and a second end portion 1475, and the configurations of the first end portion 1465 and the second end portion 1475 may correspond to the configurations of the first protruding portion 1463 and the second protruding portion 1473 (as shown in FIG. 2A to FIG. 2E). The first fixing element 141c (comprising a first connection portion 144c and a first fixing portion 146c) and the second fixing element 142c (comprising a second connection portion 145c and a second fixing portion 147c) may be configured similar to each other but mirrored (that is, parts of the first fixing element 141c are configured to be side-to-side or upside-down from corresponding parts of the second fixing element 142c); alternatively, in some embodiments, the first fixing element 141c and the second fixing element 142c may be designed totally different, but only need to be capable of respectively containing the two end portions of the wireless communication module 10. In other words, in this embodiment, the configuration of the second connection portion 145c may correspond to the configuration of the first connection portion 144c, and the configurations of the second containing portion 1451 and the second hollow portion 1453 may respectively correspond to the configurations of the above-mentioned first containing portion 1441 and the first hollow portion 1443, which is thus not described here again.

In addition, the configuration of the second fixing portion 147c may correspond to the configuration of the first fixing portion 146c, and the configurations of the second neck portion 1472, the second end portion 1475, the second slot portion 1476, the second buckling portion 1477, and the second opening portion 1478 may respectively correspond to the configurations of the above-mentioned first neck portion 1462, the first end portion 1465, the first slot portion 1466, the first buckling portion 1467, and the first opening portion 1468, which are thus not described here again. Hence, compared with the fixation with only one first fixing element 141a, 141c (or one fixing element 140a), the wireless communication module 10 can be fixed to the frame element 12 of the communication device 1 more stably through the fixation with two or more fixing elements (comprising the first fixing element 141a, 141c and the second fixing element 142c), thereby avoiding unnecessary relative displacements of the wireless communication module 10 with respect to the frame element 12.

Figure 5A:
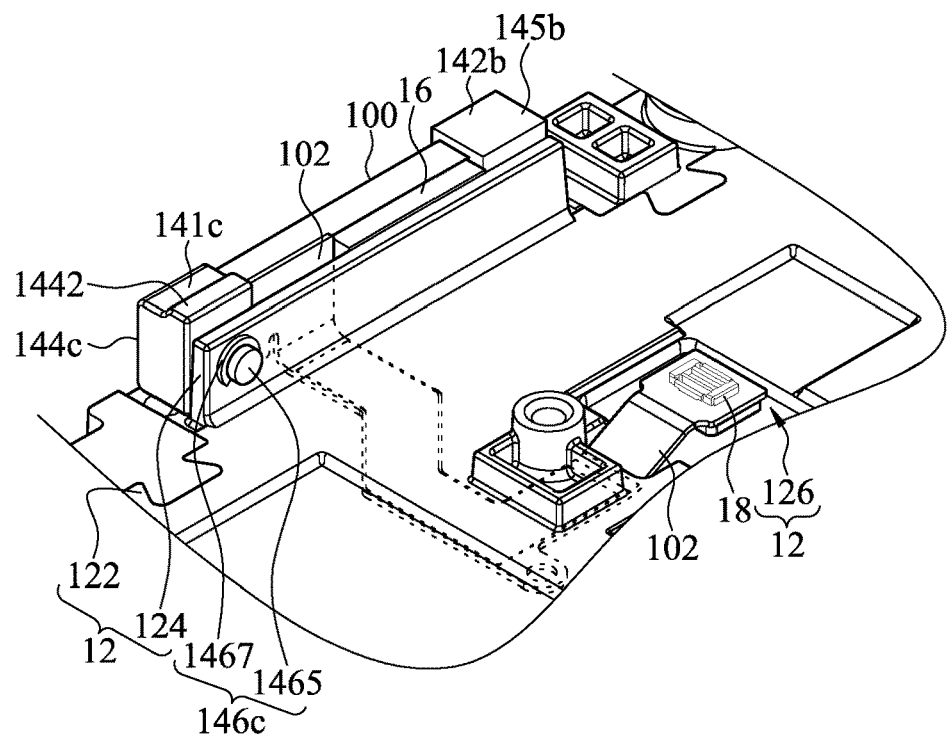
FIG. 5A illustrates an enlarged partial perspective view of a communication device according to some embodiments.
Figure 5B:
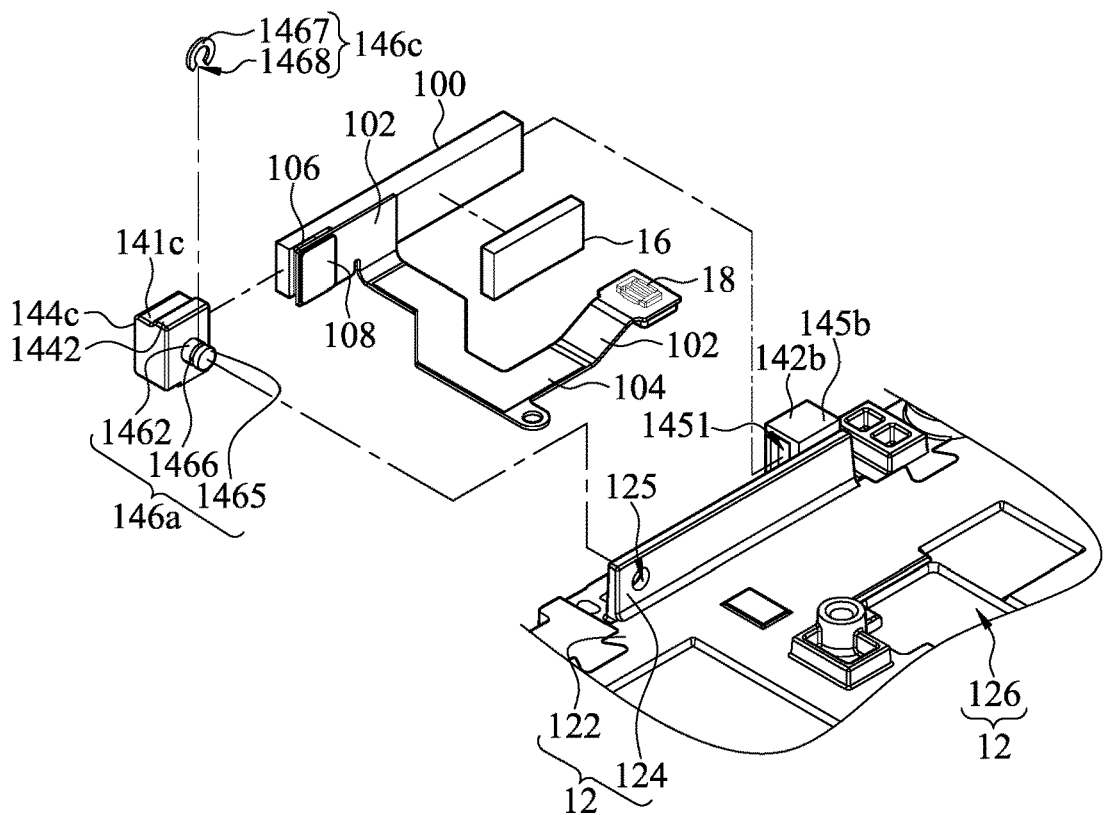
FIG. 5B illustrates a partial exploded view of the communication device shown in FIG. 5A.
Figure 5C:
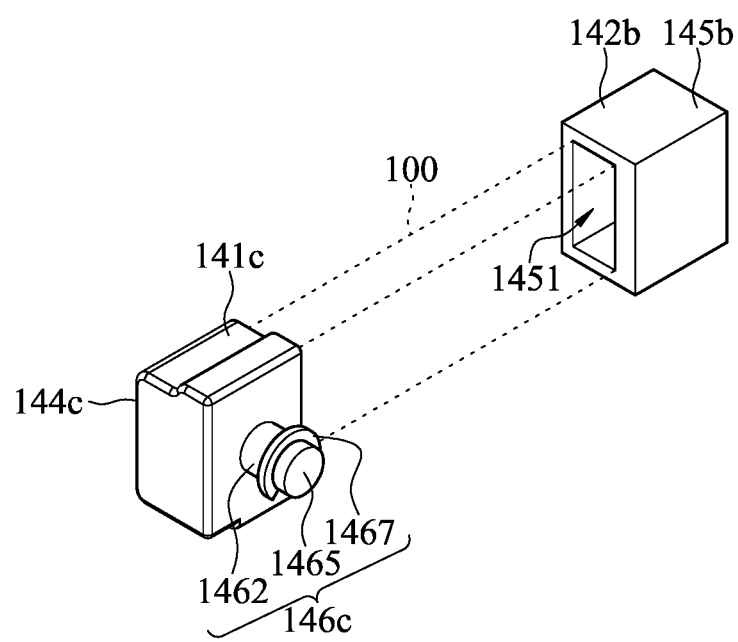
FIG. 5C illustrates a perspective view of the first fixing element and the second fixing element shown in FIG. 5A.

Please refer to FIG. 5A to FIG. 5C. FIG. 5A illustrates an enlarged partial perspective view of a communication device 1 according to some embodiments. FIG. 5B illustrates a partial exploded view of the communication device 1 shown in FIG. 5A. FIG. 5C illustrates a perspective view of the first fixing element 141c and the second fixing element 142b shown in FIG. 5A. Compared with the first fixing element 141a shown in FIG. 2A to FIG. 2E, the first fixing element 141c shown in FIG. 5A to FIG. 5C may correspond to the first fixing element 141c shown in FIG. 4A to FIG. 4C, which is thus not described here again. Further compared with the second fixing element 142b shown in FIG. 3A to FIG. 3C, the second fixing element 142b shown in FIG. 5A to FIG. 5C may correspond to the second fixing element 142b shown in FIG. 3A to FIG. 3C, which is thus not described here again. Hence, compared with the fixation with only one first fixing element 141a, 141c (or one fixing element 140a), the wireless communication module 10 can be fixed to the frame element 12 of the communication device 1 more stably through the fixation with two or more fixing elements (comprising the first fixing element 141a, 141c and the second fixing element 142b), thereby avoiding unnecessary relative displacements of the wireless communication module 10 with respect to the frame element 12.

Accordingly, in some embodiments, through containing at least one end portion of the component to be fixed (such as the wireless communication module) by the fixing element (or for example, the first fixing element and/or the second fixing element) and fixing the fixing element (or for example, the first fixing element and/or the second fixing element) with another component (such as the frame element), the component to be fixed can be stably fixed with the another component. Hence, in some embodiments, the fixing elements (or for example, the first fixing element and/or the second fixing element) are not necessarily needed to be stacked on the component for fixation, while the limited space of the fixing elements can be still fully and effectively used. In some embodiments, in addition to the above effects, the component to be fixed can be fixed without unnecessary relative displacements with respect to the another component. Moreover, in some embodiments, upon the wireless communication module is impacted by external forces, the components and internal elements thereof can be prevented from being detached off or falling down.

Although the instant disclosure is disclosed in the foregoing embodiments as above, it is not intended to limit the instant disclosure. Any person who is familiar with the relevant art can make some changes and modifications without departing from the spirit and scope of the instant disclosure. Therefore, the scope of the instant disclosure shall be subject to the definition of the scope of patent application attached to the specification.

What is claimed is:

1. A communication device comprising:
   a wireless communication module;
   a frame element comprising a bottom plate and a side plate, wherein the bottom plate is connected to the side plate, and the side plate comprises a fixing hole; and
   a fixing assembly comprising a first fixing element and a second fixing element, wherein the first fixing element comprises:
   a first connection portion comprising a first containing portion, wherein the first containing portion is adapted to contain an end of the wireless communication module; and
   a first fixing portion comprising a first neck portion and a first protruding portion, wherein the first neck portion is adapted to be in the fixing hole, the first neck portion is connected between the first connection portion and the first protruding portion, and a dimension of the first protruding portion is greater than a dimension of the first neck portion; and
   wherein the second fixing element comprises:
   a second connection portion comprising a second containing portion, wherein the second containing portion is adapted to contain the other end of the wireless communication module; and
   a second fixing portion adapted to be fixed to the frame element.

2. The communication device according to claim 1, wherein the first fixing portion further comprises a first guiding portion, the first guiding portion is connected to the first protruding portion, the first guiding portion is away from the first connection portion.

3. The communication device according to claim 2, wherein the first fixing portion further comprises a first auxiliary portion on the first guiding portion, the first auxiliary portion is away from the first connection portion, and a dimension of the first auxiliary portion is greater than a dimension of the first guiding portion.

4. The communication device according to claim 1, wherein the first fixing element further comprises a first buckling portion, the first buckling portion is detachably on the first neck portion, and the side plate is between the first connection portion and the first buckling portion and is adapted to fix the frame element with the fixing assembly.

5. The communication device according to claim 1, wherein the side plate comprises another fixing hole, and the second fixing portion comprises:
   a second neck portion in the another fixing hole; and
   a second protruding portion, wherein the second neck portion is connected to the second connection portion and the second protruding portion and is adapted to fix the frame element with the fixing assembly.

6. The communication device according to claim 5, wherein the second fixing portion further comprises a second guiding portion, the second guiding portion is connected to the second protruding portion, and the second guiding portion is away from the second connection portion.

7. The communication device according to claim 6, wherein the second fixing portion further comprises a second auxiliary portion on the second guiding portion, and the second auxiliary portion is away from the second connection portion.

8. The communication device according to claim 5, wherein the second fixing element further comprises a second buckling portion, the second buckling portion is detachably on the second neck portion, and the side plate is correspondingly between the second connection portion and the second buckling portion of the second fixing portion and is adapted to fix the frame element with the fixing assembly.

9. The communication device according to claim 1, wherein the first containing portion of the first fixing element comprises a first section and a second section, the first section and the second section are in communication with each other, and a size of the second section is greater than a size of the first section.

10. The communication device according to claim 1, wherein the first connection portion further comprises a first hollow portion on the first connection portion, and the first hollow portion is away from the frame element.

11. The communication device according to claim 1, wherein the second connection portion further comprises a second hollow portion on the second connection portion, and the second hollow portion is away from the frame element.

12. The communication device according to claim 1, wherein the wireless communication module comprises an antenna element and a circuit element, the antenna element is connected to the circuit element, and the circuit element is adapted to be connected to a circuit board of the communication device.

13. The communication device according to claim 12, wherein the wireless communication module further comprises a connecting element, and the connecting element is between the antenna element and the circuit element to connect the antenna element with the circuit element.

14. The communication device according to claim 1, further comprising a reinforcing element between the wireless communication module and the fixing assembly.

15. The communication device according to claim 1, further comprising a heat dissipation element between the wireless communication module and the frame element.

16. A fixing element adapted to fix a wireless communication module with a frame element, wherein the fixing element comprises:
   a first connection portion comprising a first containing portion;
   a first fixing portion comprising a first neck portion and a first protruding portion, wherein the first neck portion is connected to the first connection portion and the first protruding portion, the first neck portion is adapted to be in a fixing hole of the frame element, the first protruding portion is connected to the first neck portion, and a dimension of the first protruding portion is greater than a dimension of the first neck portion;
   a second connection portion comprising a second containing portion; and
   a second fixing portion adapted to be fixed to the frame element;
   wherein the first containing portion of the first connection portion is adapted to contain an end of the wireless communication module, the second containing portion of the second connection portion is adapted to contain the other end of the wireless communication module, and the first fixing portion is adapted to be fixed to the frame element.

17. The fixing element according to claim 16, wherein:
   the first connection portion comprises a first section and a second section, the first section is in communication with the second section, and a size of the second section is greater than a size of the first section; and
   the first fixing portion further comprises a first guiding portion, wherein the first guiding portion is away from the first connection portion, and the first protruding portion is connected to the first neck portion and the first guiding portion.

* * * * *